United States Patent [19]

Chadwick

[11] 3,730,542
[45] May 1, 1973

[54] CONVERTIBLE TRAILER
[76] Inventor: Charlie F. Chadwick, R.R. No. 1, Minot, N. Dak.
[22] Filed: May 20, 1970
[21] Appl. No.: 39,037

[52] U.S. Cl. .................280/9, 214/505, 280/494
[51] Int. Cl. .............................................B62b 13/18
[58] Field of Search.........................280/8, 9, 10, 11, 280/13, 414 R, 414 A; 214/505, 506

[56] References Cited
UNITED STATES PATENTS
3,010,731  11/1961  Kenney .................................280/9
3,503,620  3/1970  Koskovich...........................280/11
3,584,753  6/1971  Voeller................................214/505

Primary Examiner—Benjamin Hersh
Assistant Examiner—Robert R. Song
Attorney—Walter Kruger

[57]  ABSTRACT

A snowmobile trailer convertible to a sled which can be towed by the snowmobile. The trailer includes skiis which are retractible for highway travel of the trailer. A unique lock mechanism locks the skiis in position and also provides the proper form of connection between the draw bar and frame of the trailer to facilitate loading and to assure that the trailer is used properly.

11 Claims, 10 Drawing Figures.

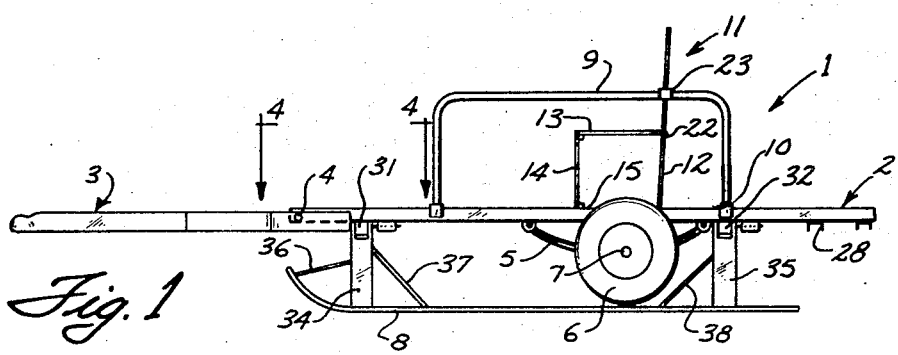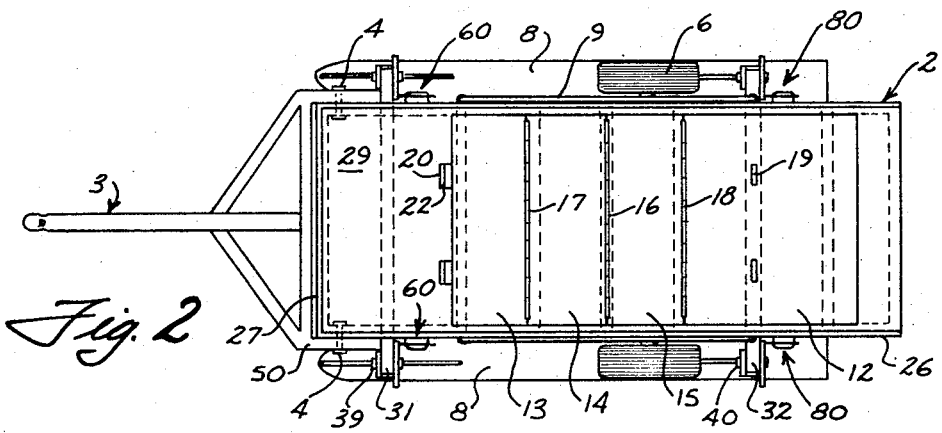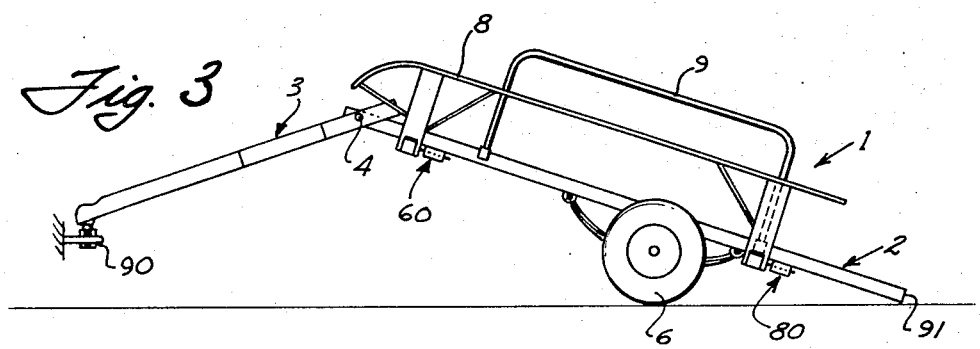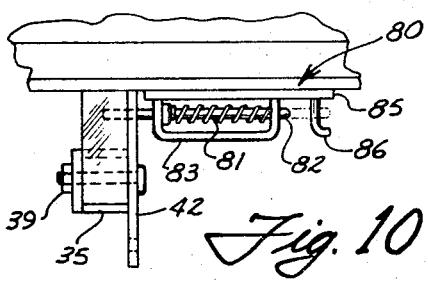

CONVERTIBLE TRAILER

This invention relates to a vehicle which is convertible from a wheeled vehicle to a sled.

More particularly, the invention relates to a trailer which can be used to transport a snowmobile or other tractive type vehicle on the highways, and which can be converted to a sled to be towed behind the snowmobile.

During the past several years, snowmobiles and like snow traveling vehicles have increased tremendously in popularity. Frequently, the user of the snowmobile will simply rent the snowmobile in a winter sports area rather than be bothered with transporting the snowmobile to and from the area where it can be used, because of the difficulties in the past of transporting such a snowmobile, which usually weighs on the order of 1,000 pounds.

However, it is necessary to transport a snowmobile on another vehicle over terrain where the snowmobile cannot be driven, because of area without snow, such as cleared highways. In these instances, the snowmobile must be loaded on a truck or trailer, transported to the site of use, and then unloaded. Because the snowmobile is of substantial weight, 1,000 pounds or so, loading or unloading the snowmobile requires either a loading ramp or other special equipment to load the snowmobile on the transporting vehicle.

Snowmobiles have a limited seating capacity. Therefore, where it is desirable to carry cargo or more than two or three people, a trailer must be connected to the rear of the snowmobile. Where the conditions are such that a snowmobile can be used, the trailer for the snowmobile must be a sled.

For highway use to transport the snowmobile, a trailer of the two-wheel type, which can be towed by an automobile or small truck is highly desirable. A towed trailer, however, must have its draw bar rigid with the remainder of the trailer or else the trailer bed or frame will pivot fore and aft about the axis of the wheels. However, for loading a vehicle such as a snowmobile on the trailer, it is desirable to tilt the bed or frame of the trailer rearwardly so the snowmobile or other vehicle can be driven directly onto the bed under its own power, and hence, separate loading equipment is not required. Such tilting of the trailer frame or bed is accomplished quite readily in accordance with this invention, even when the tongue is connected to the towing vehicle by pivotally connecting the tongue or draw bar of the trailer to its frame and by providing a selectively operable latch to permit the bed to tilt rearwardly for loading. However, as soon as the snowmobile is moved to a position where its center of gravity and that of the bed or frame of the trailer is forward of the axis of the trailer wheels, the bed will tilt forward and there will be a tendency for the front of the bed to swing down into engagement with the ground. With the trailer of this invention a selectively operable lock or stop is actuable to a position in which the trailer bed is permitted to tilt rearwardly for loading while the tongue or draw bar is connected to the towing vehicle, but is prevented from tilting in a forward direction below a level in which the bed is substantially horizontal.

As stated above, when a two-wheel trailer is used on the highway, the tongue must be rigid with the wheels to prevent the trailer frame from tilting around the axis of the wheels. However, a sled is stable fore and aft and when the skis or runners are in the ground engaging position, and the trailer is towed by a snowmobile, a tongue rigid with the frame is undesirable because the trailed sled will tend to either increase or decrease the weight on the rear of the snowmobile as the vehicles pass over an undulating or bumpy snow covered terrain. Desirably, the draw bar should be free to pivot at its point of connection with the snowmobile, as well as about a horizontal axis at the trailer. In accordance with another aspect of this invention, the draw bar of the trailer can be selectively locked against movement relative to the trailer frame for use of the trailer as a highway vehicle, but the draw bar can also be released for pivotal movement relative to the frame for use of the trailer as a sled.

The convertible trailer of this invention includes a single axle with two ground engaging wheels. In addition, there are a pair of skis or runners mounted at opposite sides of the vehicle frame for pivotal movement from a lowered or ground engaging position in which the runners are below the wheels to an upper or retracted position in which the runners are above the wheels. The conversion from a wheeled trailer to a snow sled is accomplished quite readily by merely releasing a series of locks or latches which free the skis for movement to the upper or lower positions, and which are then actuated to lock the skis in the desired positions.

Advantageously, the locks or latches are so arranged that simple instructions to the user of the convertible trailer insure that the tongue or draw bar will be in its proper latched, unlatched, or partially latched condition when the trailer is used respectively, for road travel, as a sled, or for loading a snowmobile or other vehicle on the trailer. In this respect, the locking or latch mechanisms at the front of the trailer are so arranged that moving these latch mechanisms to a designated position for a particular use of the trailer lock the tongue in the appropriate latched, partially latched or unlatched condition. Hence, by following simple instructions, the user is assured that the trailer tongue is properly connected to the trailer for the particular function to be performed by the trailer.

Were it not for the unique cooperating latch mechanism of this invention via which proper positioning of the tongue latch mechanism is assured, several possibly dangerous conditions could exist. For example, one could inadvertently position the tongue latch in the position for use of the trailer as a sled while loading the snowmobile onto the vehicle. As previously explained, when the trailer is used as a sled, the tongue is free to pivot about its horizontal pivot connection with the trailer frame. Hence, as the snowmobile is driven onto the trailer and passes the balance point of the frame, the frame would be free to tilt to a full forward position and strike the ground with possible damage to the snowmobile or trailer. In applicant's arrangement, when the lock is properly positioned for loading, the trailer frame is free to pivot rearwardly, but cannot pivot beyond an aligned position with the tongue in a forward direction. Advantageously, such loading is accomplished while the draw bar is attached to the towing vehicle and hence, the snowmobile loading can be performed by one man since movement of the trailer is resisted by the towing vehicle.

Similar dangerous conditions could exist if the latch is left in the sledding or loading position when the trailer is used on the highway. If the latch is left in either of these positions when the trailer is used for highway travel, the snowmobile could readily fall from the trailer as the trailer bed tilts to and fro at the pivot connection with the tongue. With the convertible trailer of this invention, these problems are all avoided by virtue of a lock arrangement in which the lock or latch which locks the skis or runners in the extended or retracted positions also locks the tongue in the proper position for a particular use of the trailer.

Some additional advantageous features of the trailer include a seat which is erectable to an upright position for transporting people when the trailer is used as a sled, yet is foldable to a flattened position in which it reinforces the floor of the trailer and supports a snowmobile on the trailer. In addition, it will be appreciated that the trailer of this invention requires no separate bed which is tiltable relative to the frame, the pivot connection between the frame and the tongue providing for pivoting the frame about the wheels for loading a snowmobile.

Correspondingly, an object of this invention is a trailer which is convertible from a two-wheeled highway trailer particularly adapted to transport a snowmobile, to a sled which is adapted to be towed by the snowmobile.

Another object is a convertible trailer having a rigid frame and a pivotal connection between the frame and the draw bar of the trailer to provide for loading the snowmobile or other vehicle on the trailer by tilting the frame while the trailer draw bar is attached to the towing vehicle.

Another object is a convertible trailer with a folding seat arrangement which is readily erectable to an occupant holding position when the vehicle is in use as a sled.

A further object is a vehicle convertible from a two-wheeled trailer to a sled in which a unique latch mechanism is provided to assure that the relationship between the tongue and the trailer frame is proper for a particular use of the trailer.

A still further object is a trailer convertible from a highway vehicle to a sled in which a snowmobile can be loaded on the trailer by a single person as a result of the unique arrangement of the trailer which permits such loading while the trailer is connected to its towing vehicle.

A still further object is a unique trailer convertible from a two-wheeled vehicle to a sled in which skis or runners are pivotally connected at opposite sides of the trailer frame for pivotal movement from a ground engaging position below the wheels of the trailer to a retracted position above the wheels of the trailer, a unique latch mechanism cooperates with the skis to hold the skis in the desired positions and also cooperates with the tongue of the trailer to provide for locked, pivotal, or restricted pivotal movement between the trailer and the tongue, and in which the utility of the trailer both as a highway vehicle and as a sled embodies the most advantageous features of a vehicle for this particular use.

A not to be overlooked object is a convertible trailer of the type described in which the trailer is rugged and durable, is particularly adapted for use as a sled as well as a highway vehicle, is readily loaded by driving a snowmobile or other vehicle onto the trailer, is relatively inexpensive to construct, and is extremely reliable and safe to use.

Numerous other objects, advantages, and features of this invention will become apparent with reference to the drawings which form a part of this specification in which:

FIG. 1 is a side elevational view of the convertible trailer showing the skis in the ground engaging position and the seat erected for carrying passengers;

FIG. 2 is a top plan view of the convertible trailer with the skis down and with the seat in its unfolded position;

FIG. 3 is a side elevational view of the trailer with the skies up and with the trailer tilted for loading and unloading;

FIG. 10 is an enlarged partial view of a rear latch of the trailer.

Figure 4:
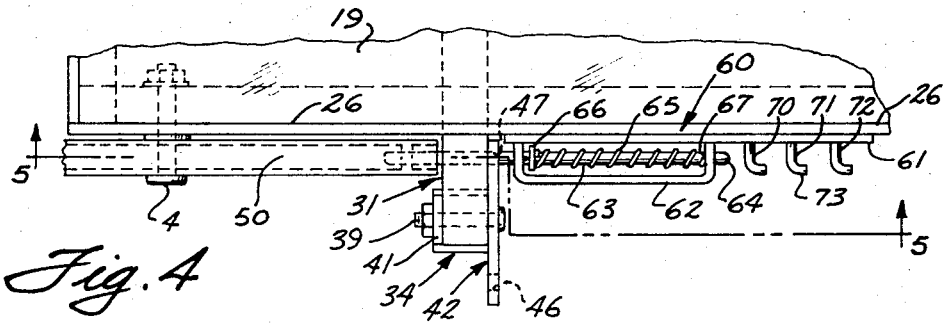
FIG. 4 is an enlarged partial top plan view of a front latch for the trailer taken along line 4—4 of FIG. 1, showing the latch pin in its position for use of the trailer as a highway trailer.

Referring now to the drawings in detail, and particularly to FIG. 1, there is shown the convertible trailer 1 of this invention. Trailer 1 includes a generally rectangular frame 2 having a draw bar or tongue 3 connected to the frame adjacent its forward end at a pivot in the form of pins 4 which provide for pivotally connecting the frame to the tongue. Connected to the underside of frame 2 by springs 5 are wheels 6 at opposite ends of a common axle 7.

A pair of skis or runners 8, are mounted respectively, for pivotal movement about longitudinal axes adjacent each side edge of the frame between the ground engaging position of FIGS. 1 and 2 and the retracted or upper position of FIG. 3.

Extending upwardly above the frame and secured to the respective side rails of the frame are a pair of inverted U-shaped hand grip bars 9. As shown at FIGS. 1 and 2, hand grip bars 9 are connected to sockets 10 mounted on the side edges of the respective side members of the frame.

Also mounted on frame 2 is a foldable seat 11 which includes a back panel 12, a seat panel 13, a front panel 14, and a bottom panel 15. With reference to FIGS. 1 and 2, it will be seen that bottom panel 15 is secured to frame 2, a hinge 16 connects the front edge of panel 15 to the rear edge of panel 14, a hinge 17 connects the front edge of panel 14 to the rear edge of panel 13, and a hinge 18 connects the rear edge of panel 15 to panel 12. Formed in panel 12 are locking slots 19 which are parallel with each other transversely of the trailer and are each of a size to receive the locking arms 20 at the front edge of panel 13. Arms 20 are formed with offset locking edges 22 which extend downwardly to prevent panels 13 and 14 from moving forward relative to panel 12 when the seat is in the upright or erected position of FIG. 1. In addition, fastening connectors 23 are provided on bars 9 to secure panel 12, which forms the seat back in the upright position of FIG. 1 to maintain the seat erect during use of the vehicle as a sled.

As shown at FIGS. 1 and 2, frame 2 is rectangular and elongated. The frame is fabricated from structural members including angle iron side rails 26 and an angle iron front rail 27. There are also a plurality of transversely extending parallel intermediate rails 28 (FIG. 5), each of which takes the form of an inverted U-shaped channel. A sheet metal floor 29 is mounted on and extends between the several side, front and intermediate rails to provide a support for panels 12–15, as well as for cargo, such as a snowmobile. Extending under frame 2 and of a length somewhat greater than the width of the frame are parallel ski support cross members 31 and 32. Front cross member 31 is located toward the front of frame 2 adjacent the rear edge of draw bar 3, and rear cross member 32 is located toward the rear of the frame behind wheels 6. Each cross member takes the form of a box-beam.

As shown at FIGS. 1–3, each ski is supported by a pair of spaced apart parallel support arms 34, 35 which are secured to the top face of the ski and extend away from the ski in a direction perpendicular to the plane of the ski. As shown at FIG. 4, for the support arm 34, each support arm is a structural member which is box-shaped, as viewed in transverse section. In addition, brace elements 36 and 37 are secured between support arm 34 and the nose of the ski, as well as between support arm 34 and a portion of the ski rearwardly of the support arm. There is also a brace rod 38 which is secured to rear support arm 35 and extends at approximately a 45° angle toward ski 8 where it is secured to the top of the ski at a location forwardly of arm 35. Arms 34 and 35 are spaced apart the same distance as cross members 31 and 32 and are pivotally connected to these cross members by the respective pivot pins 39 and 40 which extend through the cross members. Pivot pins 39 and 40 are aligned with each other and are outwardly of the side rails 26 of the frame.

Figure 9:
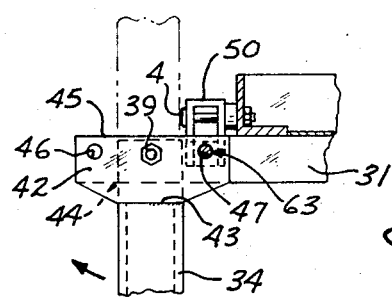
FIG. 9 is a partial view taken along line 9—9 of FIG. 5 and showing the pivotal latch plate of the ski support.

As shown at FIGS. 4 and 9 for support arm 34, the rear and side walls of each arm are cut away, but the front wall 41 is left intact so it extends across the front face of cross member 31 and end 43 of the arm is spaced from the bottom face of the cross member. An aligning plate 42 is secured, as by welding, to the rear wall of arm 34. The distance between the front face of plate 42 and the rear face of front wall 41 is only slightly greater than the width of the cross member. As shown at FIG. 4, pivot pin 39 extends through plate 42, cross member 31 and wall 41 to pivotally connect arm 34 to the cross member. As shown at FIG. 9, there is a clearance space between end 43 of arm 34 and bottom surface 44 of cross member 31 so arm 34 can pivot about pin 39. As shown at FIG. 9, plate 42 is formed with a pair of apertures 46 and 47, each spaced the same distance from and in the same horizontal plane as the axis of pivot pin 39. Plate 42 is elongated, having a length greater than the width of arm 34, and a top edge 45 which is flush with the top surface of cross member 31 when the runners 8 are in the ground engaging position.

Figure 5:
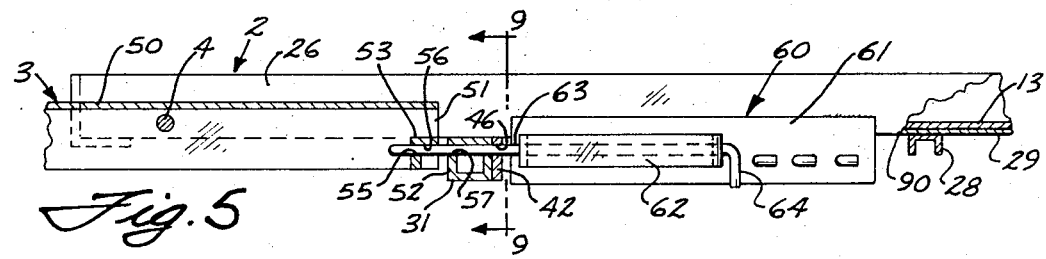
FIG. 5 is a partial view in section taken along line 5—5 of FIG. 4 showing the latch pin in the highway trailer position.

As shown at FIGS. 1, 2 and 4, draw bar 3 is so constructed that rear portions 50 of draw bar 3 extend along opposite sides of the frame in parallel relation to the frame with only a slight clearance space between the side edges of the frame and the inwardly facing surfaces of the rear portions 50. With reference to FIG. 5, each rear portion 50 has a rear edge 51 which is closely adjacent front face 52 of cross member 31, but is spaced sufficiently therefrom that frame 2 and tongue 3 can pivot relative to each other about the axis of pivot pin 4. As shown at FIG. 9, rear portion 50 of the tongue takes the form of an inverted U-shaped channel with downwardly extending sides. Mounted between the sides is a short length of angle iron 53 which is secured to the sides by welding. Formed in the vertical leg of angle 53 is a bore 55 which has its top edge coplaner with the bottom surface 56 of the horizontal leg of the angle. Formed in cross member 31 are aligned bores 57 which are in alignment with bore 55 when the tongue is horizontal and aligned with the frame, as shown at FIGS. 1 and 5.

Mounted on side rail 26, to the rear of cross member 31, is a front latch assembly 60. Latch assembly 60 includes a mounting plate 61 which is welded to side rail 26. A U-shaped latch pin support bracket 62 is secured to plate 61 as shown at FIGS. 4 and 5. Extending through aligned openings formed in support bracket 62 is an elongated latch or lock pin 63. As shown at FIG. 5, the rear portion of pin 63 terminates in a downwardly bent handle 64 which provides a hand grip for manipulating the pin. Pin 63 is constantly urged toward cross member 31 by the action of compression spring 65 which seats at one end on a washer 66 connected to the pin against forward movement, and at the other end on the forwardly facing surface 67 of bracket 62.

Also mounted on plate 61 and extending outwardly therefrom are a plurality of pin positioning abutment rods 70–72. These abutment rods each have a rearwardly extending end portion 73 over which handle 64 of pin 63 can be moved to secure pin 63 against movement as a result of shock or vibration. Pin 63 remains in engagement with a selected one of abutment rods 70–72 by virtue of the action of spring 65 which urges the pin 63 forwardly toward cross member 31.

Rear latch member 80 is similar to front latch member 60. As shown at FIG. 10, the rear latch member includes a pin 81 which has a downwardly bent handle 82, like the handle 64 of pin 63. The assembly includes a U-shaped support bracket 83 through which the pin extends. The bracket 83 is secured to a plate 85 welded to side rail 26. A stop rod 86 is secured to and projects outwardly from the plate and has a rearwardly extending end 86 which provides for hooking the handle of pin 83 over the abutment rod. Rear cross member 35 is provided with an opening to receive the forward end of the pin, when the pin is in the forward position of FIG. 10.

With further reference to FIG. 5, it will be seen that cross rail 28 extends across the under surface 90 of side rail 26 and engages the bottom surface of floor 29. Panel 13 is seen to lie flat against floor 29.

USE AND CONVERSION

When trailer 1 is used for carrying a load on highways, runners 8 are in the retracted or up position of FIG. 3 so wheels 6 engage the ground. For highway travel, draw bar 3 must be locked to trailer frame 2 so it is generally aligned with the frame as shown at FIG. 5. With draw bar 3 so locked, the draw bar forms a continuation of the frame, and the draw bar and frame provide a continuous rigid unit for highway travel. The lock pins 63 of the front latch assemblies 60, when in the position of FIG. 5, perform the dual function of securing draw bar 3 rigid with frame 2 and securing plate 42 against pivotal movement on pin 39 with the runners in up or retracted position. With pin 63 in the position of FIG. 5, the pin extends through opening 46 of plate 42 (runner in the up position) and the pin also extends through bores 57 of cross member 31 and bore 55 of rear portion 50 of draw bar 3. With the pin in this position, plate 42 and correspondingly, the runner support arm 34 are locked against pivotal movement and in addition, draw bar 3 is held against pivotal movement by the forward end of the pin which extends through the opening 55.

Figure 6:
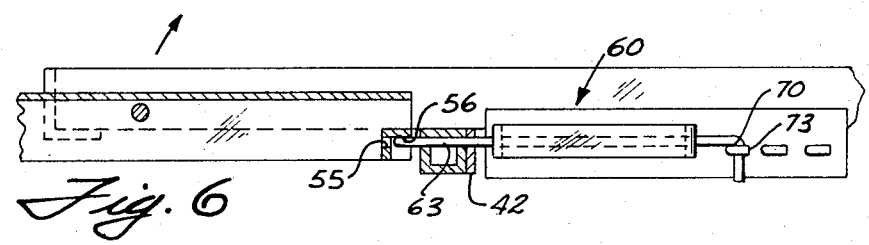
FIG. 6 is a view corresponding to FIG. 5, and showing the latch pin in the position for loading a snowmobile onto the trailer.

To load a snowmobile on the trailer, the front end of the draw bar is first coupled to the usual ball type coupling 90 connected to the rear of a towing vehicle. Then, handle 64 of each lock assembly 60 is rotated outwardly to a generally horizontal position after which the handle is pulled rearwardly until it clears the end 73 of abutment rod 70, whereupon the handle is pushed inwardly so it engages behind abutment rod 70, as shown at FIG. 6. In this position, pin 63 extends through plate 42 and cross member 31 to a position beneath lower surface 56 of angle 53. However, in this position the tip of the pin is no longer in bore 55 and hence, trailer frame 2 is free to pivot rearwardly relative to draw bar 3 to the position of FIG. 3, in which rear end 91 of the frame engages the ground. By placing blocks both in front of and in back of wheels 6, one person acting alone can tilt the trailer to the position of FIG. 3 merely by backing up the towing vehicle (pins 63 in the FIG. 6 position) which will cause the frame to pivot rearwardly so end 91 engages the ground. Then, a snowmobile can be driven onto frame 2 under its own power until it is fully on the trailer. Then, by removing the blocks from behind wheel 6 in a gradual fashion, trailer frame 2 will move toward a generally horizontal position. However, forward tilting of the trailer beyond a horizontal position is prevented by the engagement of under surface 56 with the front end of lock pin 63 as soon as this surface engages the lock pin, as shown at FIG. 6. With the trailer frame thus held in a horizontal position, handle 64 is again manipulated so the pin 63 is returned to the FIG. 5 position in which it extends through opening 55. As previously explained, with the pin in the FIG. 5 position, extending through opening 55, draw bar 3 and trailer frame 2 are locked together in a rigid condition for highway travel.

When trailer 1 is towed to the area where the snowmobile will be used, the snowmobile can readily be unloaded, and unloading is easier than loading. To unload the snowmobile it is merely necessary to again manipulate pin 63 of each front latch assembly 60 to the position of FIG. 6, in which the pin is withdrawn from opening 55. Then, it is merely necessary to very gradually back up the snowmobile until the center of gravity of the snowmobile and frame is to the rear of axle 7. When this point is reached, the trailer will tilt to the FIG. 3 position (draw bar 3 still attached to connector 90 of the towing vehicle) whereupon the snowmobile can readily be backed off the trailer.

Figure 7:
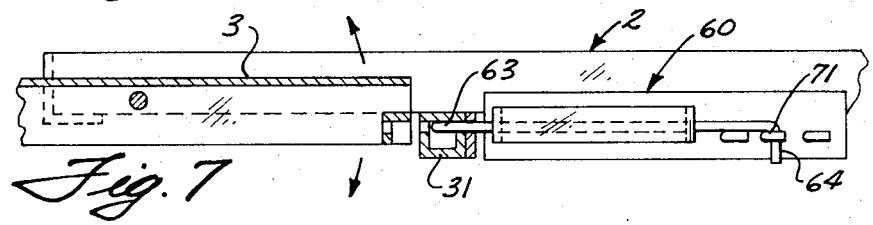
FIG. 7 is a view corresponding to FIG. 5, and showing the latch pin in its third position in which the tongue is released for use of the trailer as a sled.
Figure 8:
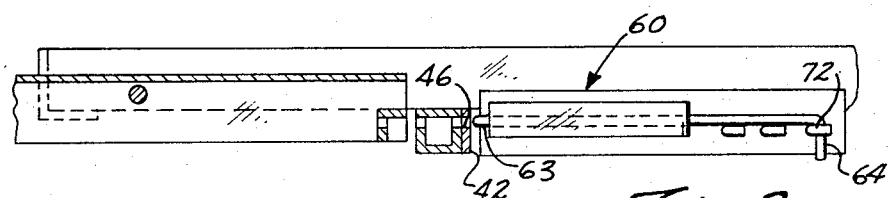
FIG. 8 is a view corresponding to FIG. 5, and showing the latch pin in its fourth position to completely release the skis for pivotal movement between the up and down positions.

Trailer 1 can also be converted to a sled in a very rapid fashion. This is accomplished by manipulating pin 63 of each latch assembly 60 so handle 64 is held in engagement with stop rod 72, as shown at FIG. 8. With pin 63 in this position, its nose is to the rear of plate 42 and correspondingly, support arm 34 is free to pivot. The pin 63, at the other side of the trailer, is also moved to the position of FIG. 8. In addition, pins 81 of rear latch assemblies 80 are pulled rearwardly and the handles 82 of these pins are hooked over abutment rods 86, as shown in phantom lines at FIG. 10. With the several pins 63 and 81 in the released positions, runners 8 are free to pivot about the axes of pivot pins 39 and 40. The runners are then pivoted downwardly to the ground engaging positions and the trailer frame is lifted slightly so opening 47 of plate 42 is aligned with pin 63. Handle 64 of each pin 63 is then manipulated so the handle hooks behind abutment rod 71. With handle 64 behind abutment rod 71, as shown at FIG. 7, pin 63 is withdrawn to a position within cross member 31 and hence, draw bar 3 is free to pivot relative to frame 2. This provides for free up and down pivotal movement of the trailer frame relative to the draw bar when the trailer is used as a sled and is towed by the snowmobile. Since the runners form a stable vehicle with no tendency to tilt fore and aft, a pivotal connection between the draw bar and trailer frame is highly desirable to permit the trailer, now used as a sled, to tilt up and down relative to the snowmobile which tows the trailer.

If it is desired to carry people on the trailer, when used as a sled, it is merely necessary to fold panels 12–15 to the erected or upright position of FIG. 1 and secure connectors 23 between hand bars 9 and back panel 12. By this simple expedient, a rigid seat for carrying people on the sled is provided.

It will be observed with reference to FIGS. 6, 7 and 10, that latch pins 63 and 81 prevent pivotal movement of plates 42 and therefore lock the skis in either the up or down positions when the trailer is used respectively, as a highway vehicle or as a sled. Pin 81 is moved to the phantom line position of FIG. 10 only when it is desired to move the skis from one position to the other. However, in all other positions of the pins, the runners are locked against pivotal movement.

In view of the foregoing, it will be apparent that the trailer of this invention is readily convertible from a highway vehicle to a sled and that one person can quite easily load and unload a snowmobile from the trailer. The aligning plates 42 of the several support arms 34, 35 cooperate with lock pins 63 and 81 respectively, to assure that the runners are also returned to precisely the same horizontal lowered position each time the vehicle is converted for use as a sled. In addition, since the pins 63 of the forward latch assemblies cooperate with both the aligning plates for the runners, as well as the draw bar 3 of the trailer, the user of the trailer is always assured that the skis are locked in position and that the proper connection between the draw bar and the trailer frame exists for a particular use of the trailer.

Since the pins 63 of the forward latch assemblies are movable to only four different positions, simple instructions to the user of the trailer will enable the user to use the trailer as both a highway trailer, as well as a sled with utmost efficiency and without danger of malfunction. Instructions with regard to the rear lock pins 83 are of course even more simple in that pin 83 is moved to the forward locking position at all times except when the runners are pivoted from one position to another.

While a preferred embodiment of a convertible trailer has been shown and described in detail, it is to be understood that numerous changes and modifications can be made in the construction defined in this application and in the appended claims without departing from the intended scope of the invention.

What is claimed is:

1. A trailer convertible from a wheeled vehicle to a sled comprising, in combination,
  a frame;
  a pair of wheels connected to said frame;
  a pair of runners;
  mounting means mounting said runners outwardly beyond the sides of said frame for pivotal movement to
    a ground engaging position below the wheels of the trailer, and
    a retracted position above the wheels, and in which the runners are above the frame;
  lock means for each runner between said frame and said mounting means and selectively positionable to
    a locked position to secure said runners in the ground engaging and retracted positions, and
    a released position in which the runners are free for pivotal movement between said positions;
  a tongue connected to the frame at a pivotal connection,
  said lock means for at least one runner including a single actuator for selectively moving the lock means to
    a first lock position to secure the runners in the retracted position and to lock the tongue against pivotal movement, and
    a second lock position to secure the runners in the ground engaging position and to release the tongue for pivotal movement about its pivotal connection;
  an extension on the tongue extending along a side of said frame;
  at least a portion of the lock means disposed adjacent a portion of said tongue;
  said single actuator of said lock means being selectively positionable to
    a first position in which a runner lock of the lock means, with the runners in a retracted position, engages the mounting means for the runners to lock the runners in the retracted position, and a tongue lock of the lock means engages the tongue extension to fix the tongue against pivotal movement about its pivotal connection, and
    a second position in which the runner lock of the lock means, with the runners in a retracted position, engages the mounting means for the runners to lock the runners in the retracted position, and the tongue lock of the lock means engages an abutment of the tongue extension to prevent downward relative movement of the tongue and frame beyond a generally aligned position with the frame while permitting upward relative movement of the tongue and frame so that a vehicle, such as a snowmobile, can be driven onto the frame by tilting the rear of the frame downwardly, but without danger of the frame pivoting forwardly beyond the generally aligned position of the tongue with the frame.

2. A trailer according to claim 1 wherein
  the single actuator of said lock means is further selectively positionable to
    an additional position in which the runners are locked in the ground engaging position and the tongue is completely released for free pivotal movement relative to the frame at its pivotal connection.

3. A convertible trailer according to claim 2 wherein
  said single actuator of said lock means is further positionable to
    an unlocked condition in which the runners are released for pivotal movement between the ground engaging and retracted positions.

4. A trailer convertible from a wheeled vehicle to a sled comprising, in combination
  an elongated frame;
  wheels connected to said frame, said wheels having an axis of rotation and being in fixed non-adjusting relation to said frame;
  a draw bar connected to the frame at a pivot connection and permitting the frame to tilt about a transverse axis spaced from the wheels, the draw bar having an extension adjacent a side of the frame;
  first and second runners;
  means mounting said runners on said frame for pivotal movement about axes extending longitudinally of the frame and outwardly of the sides of the frame
    to a ground engaging position below said wheels in which the runners are parallel to each other, and
    a retracted position in which the wheels engage the ground;
  single manually positionable means
    for preventing movement of the front of the frame downwardly beyond an approximately aligned position relative to the draw bar while allowing the frame to tilt rearwardly so a vehicle can be moved into the tilted frame, and
    for locking the frame to the draw bar against relative pivotal movement;
  said single manually positionable means including
    an elongated pin, and
    abutment means cooperating with said pin to maintain the pin in a pre-selected position; and
  said pin locks said draw bar to said frame by engaging said extension adjacent a side of the frame.

5. A trailer according to claim 4 wherein
  said manually positionable means is further positionable for releasing said draw bar for free pivotal movement relative to the frame about its pivotal connection.

6. A trailer according to claim 4 wherein
said manually positionable means is further positionable
    for locking the runners in said ground engaging and retracted positions.

7. A convertible trailer according to claim 4 wherein
said single manually positionable means is positionable to
    a first position in which said runners are locked in their retracted positions and the tongue is generally aligned with and locked rigid with the frame,
    a second position in which the runners are locked in the ground engaging position and the frame is free to pivot at the draw bar pivot connection,
    a third position in which the runners are released for pivotal movement between the ground engaging and retracted positions, and
    a fourth position in which the runners are latched in the retracted position and the frame is free to pivot rearwardly only about the draw bar pivot connection.

8. A trailer convertible from a wheeled vehicle to a sled comprising, in combination,
    a frame having sides;
    a pair of wheels;
    means connecting the frame to the wheels for pivotal movement about a transverse axis;
    a pair of runners;
    mounting means mounting said runners outwardly beyond the sides of said frame for pivotal movement to
        a ground engaging position below the wheels of the trailer, and
        a retracted position above the wheels, and in which the runners are above the frame; and
    lock means for each runner between said frame and said mounting means and selectively positionable to
        a locked position to secure said runners in the ground engaging and retracted positions, and
        a released position in which the runners are free for pivotal movement between said positions; and
    a tongue connected to the frame at a pivotal connection;
    an extension of the tongue extending beside the frame;
    said lock means for at least one runner including a runner lock, a tongue lock, and a single actuator for selectively moving the runner lock and the tongue lock to
        a first lock position in which the runner lock of the lock means engages the mounting means of a runner to secure the runner in the retracted position and in which the tongue lock of the lock means simultaneously engages the tongue extension to secure the tongue against pivotal movement relative to the frame, and
        a second lock position in which the runner lock of the lock means engages the mounting means of the runner to secure the runner in the ground engaging position and in which the tongue lock is spaced from the tongue extension to release the tongue for pivotal movement about its pivotal connection.

9. A trailer convertible from a wheeled vehicle to a sled comprising, in combination
    an elongated frame;
    wheels connected to said frame, said wheels having an axis of rotation and being in fixed non-adjusting relation to said frame;
    a draw bar connected to the frame at a pivot connection and permitting the frame to tilt about a transverse axis spaced from the wheels, the draw bar having an extension adjacent a side of the frame;
    first and second runners;
    means mounting said runners on said frame for pivotal movement about axes extending longitudinally of the frame and outwardly of the sides of the frame
        to a ground engaging position below said wheels in which the runners are parallel to each other, and
        a retracted position in which the wheels engage the ground;
    single manually positionable means
        for preventing movement of the front of the frame downwardly beyond an approximately aligned position relative to the draw bar while allowing the frame to tilt rearwardly so a vehicle can be moved into the tilted frame, and
        for locking the frame to the draw bar against relative pivotal movement;
    said extension of the draw bar includes
        means defining an aperture, and
        downwardly facing stop means;
    said positioning means cooperates with said aperture to lock the draw bar to the frame; and
    said positioning means cooperates with said abutment to prevent downward movement of the frame relative to the draw bar.

10. A trailer convertible from a wheeled vehicle to a sled comprising, in combination
    an elongated frame;
    wheels connected to said frame, said wheels having an axis of rotation and being in fixed non-adjusting relation to said frame;
    a draw bar connected to the frame at a pivot connection and permitting the frame to tilt about a transverse axis adjacent the wheels;
    first and second runners;
    means mounting said runners on said frame for pivotal movement about axes extending longitudinally of the frame and outwardly of the sides of the frame
        to a ground engaging position below said wheels in which the runners are parallel to each other, and
        a retracted position in which the wheels engage the ground;
    single manually positionable means
        for preventing movement of the front of the frame downwardly beyond an approximately aligned position relative to the draw bar while allowing the frame to tilt rearwardly so a vehicle can be moved into the tilted frame, and
        for locking the frame to the draw bar against relative pivotal movement;

said mounting means for each of said runners includes
- a structural member secured to a runner, said member including an alignment plate rigid with the member,
- a pivot parallel to a side of said frame and pivotally connecting said structural member to the frame, and means on said frame cooperating with said plate and manually positionable means to secure said runners in the ground engaging and retracted positions.

11. A trailer according to claim 10 wherein
said plate is apertured;
said means on said frame is apertured; and
said positioning means includes a pin cooperating with said apertures.

* * * * *